April 5, 1960  E. L. MAYO  2,931,181
POWER BRAKE MEANS FOR AUTOMOBILES
Filed Dec. 3, 1957  6 Sheets-Sheet 1
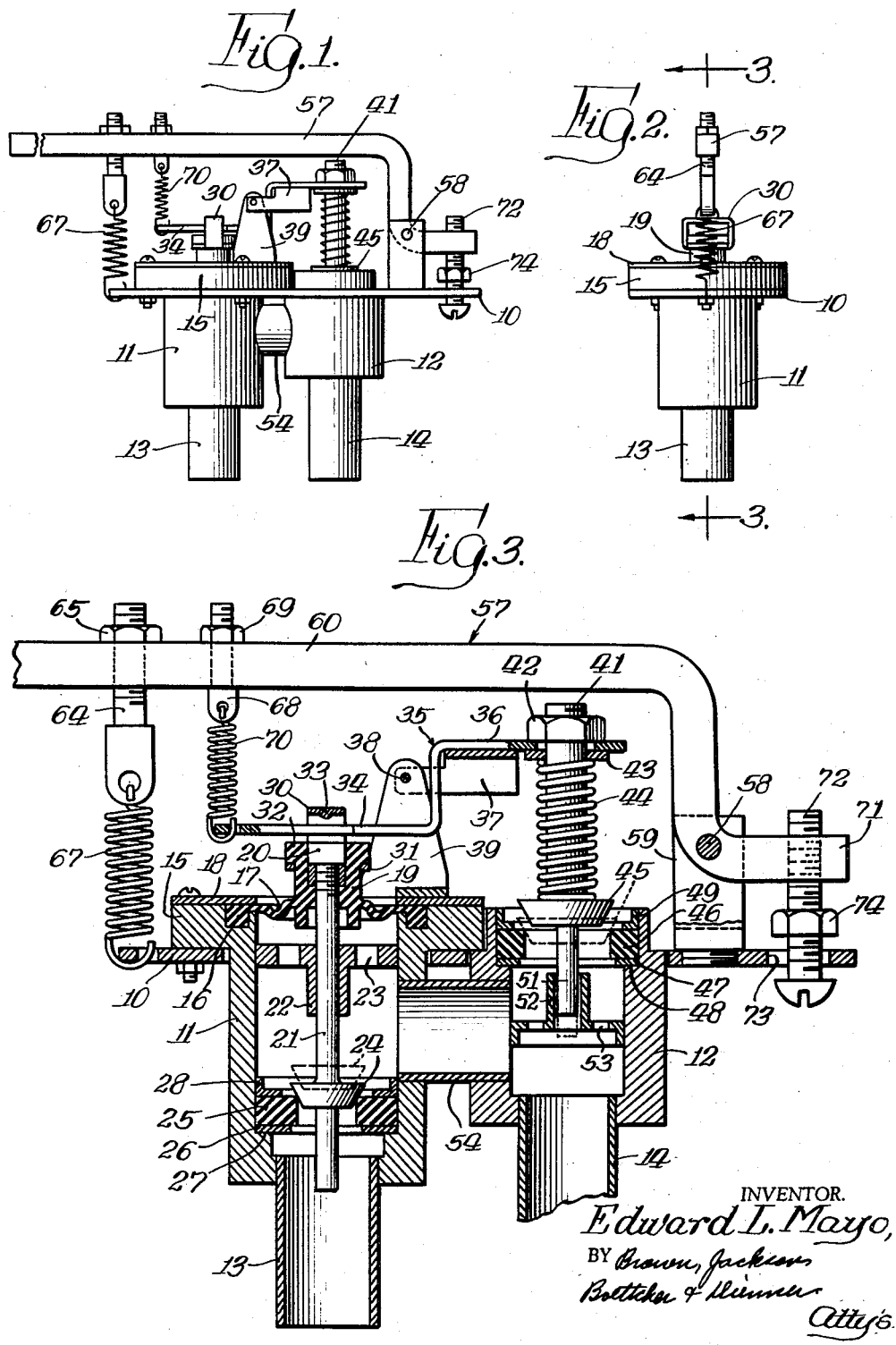
INVENTOR.
Edward L. Mayo,

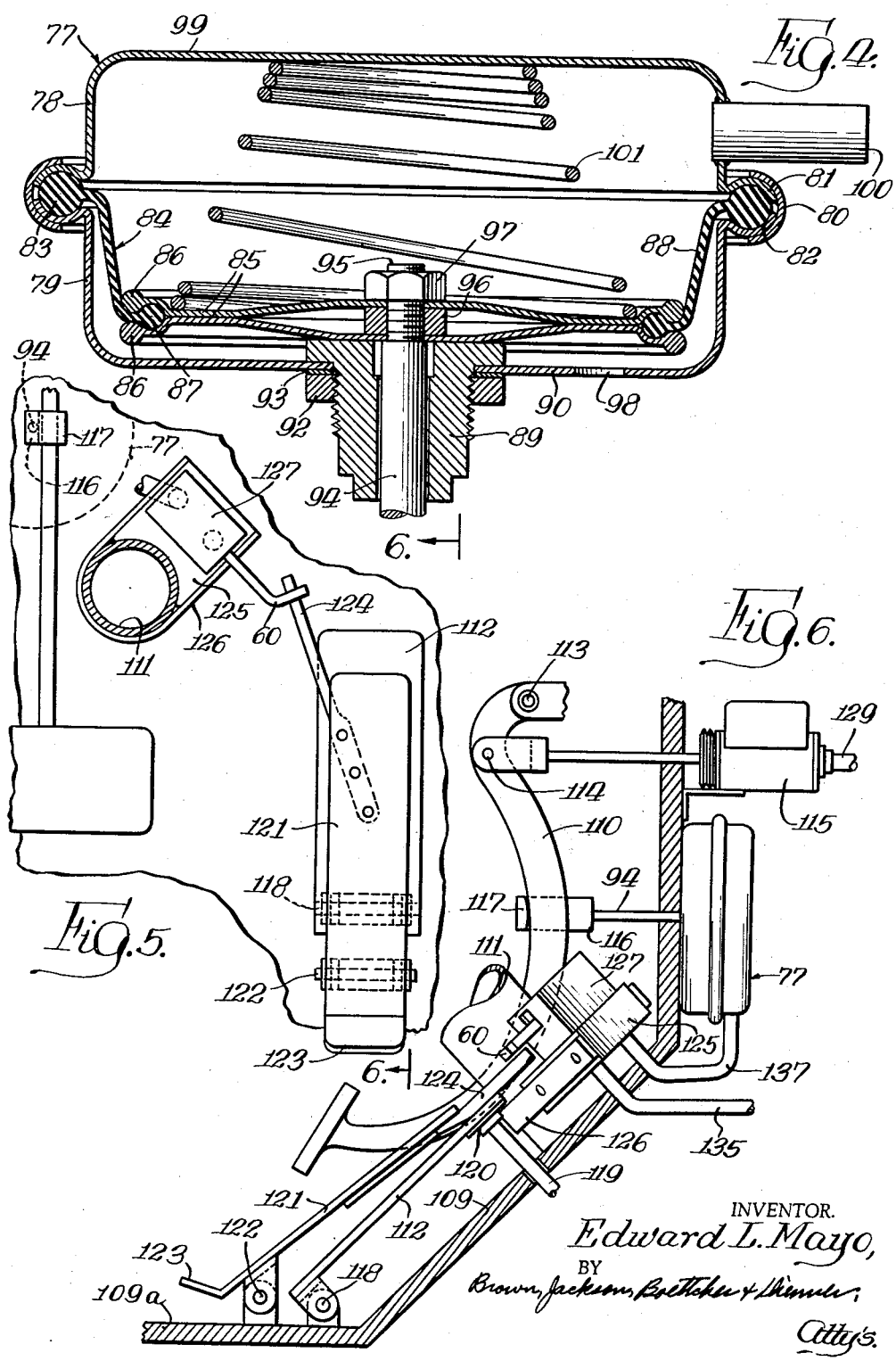

April 5, 1960 E. L. MAYO 2,931,181
POWER BRAKE MEANS FOR AUTOMOBILES
Filed Dec. 3, 1957 6 Sheets-Sheet 3
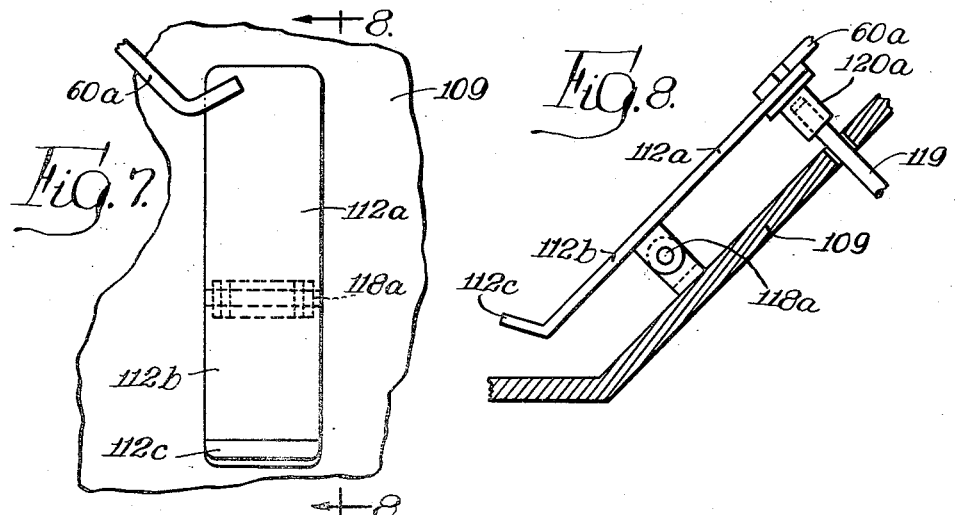
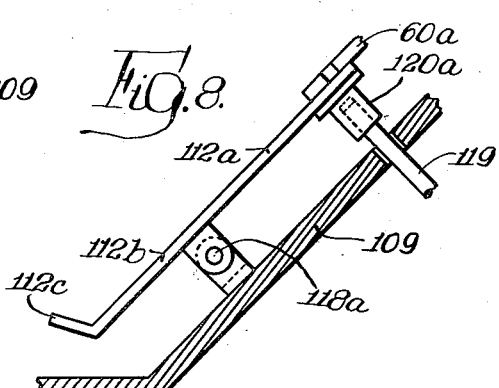
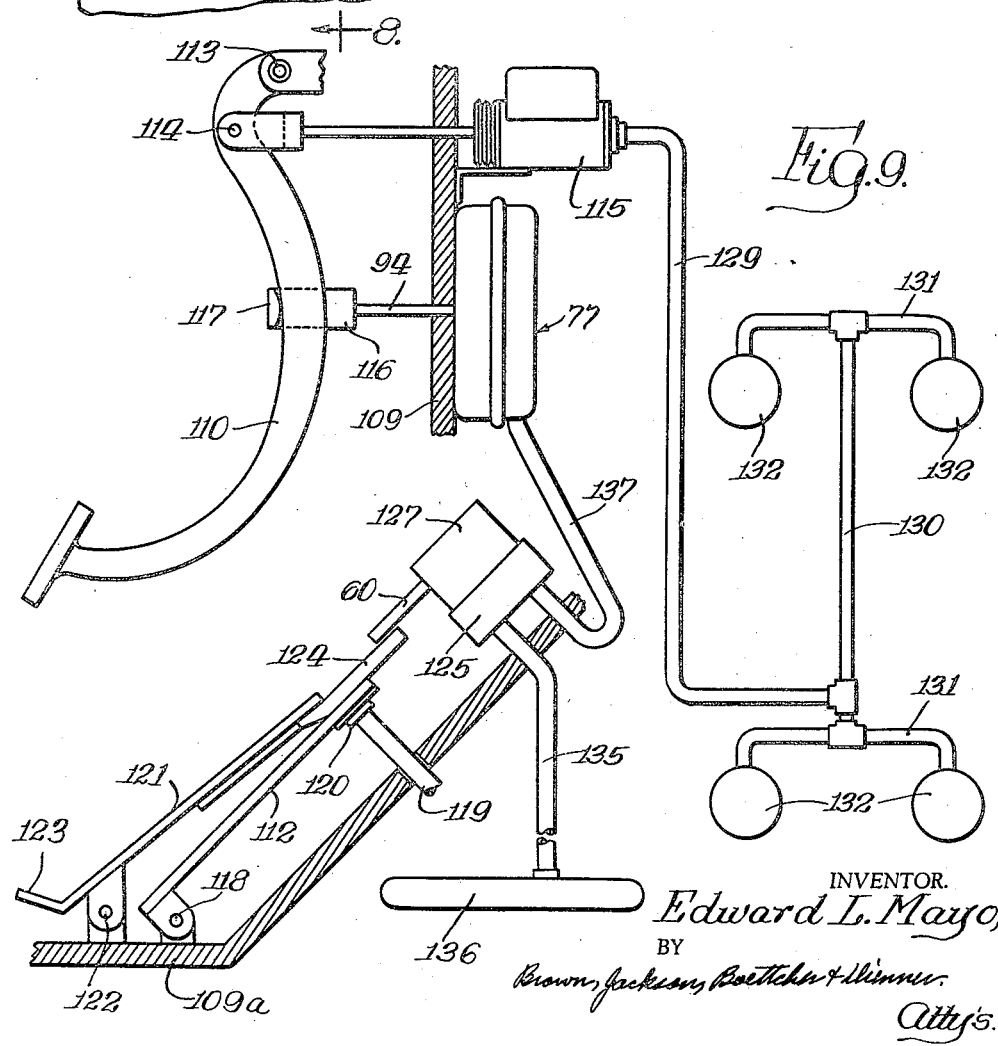
INVENTOR.
Edward L. Mayo,
BY
Brown, Jackson, Boettcher & Dienner
Attys.

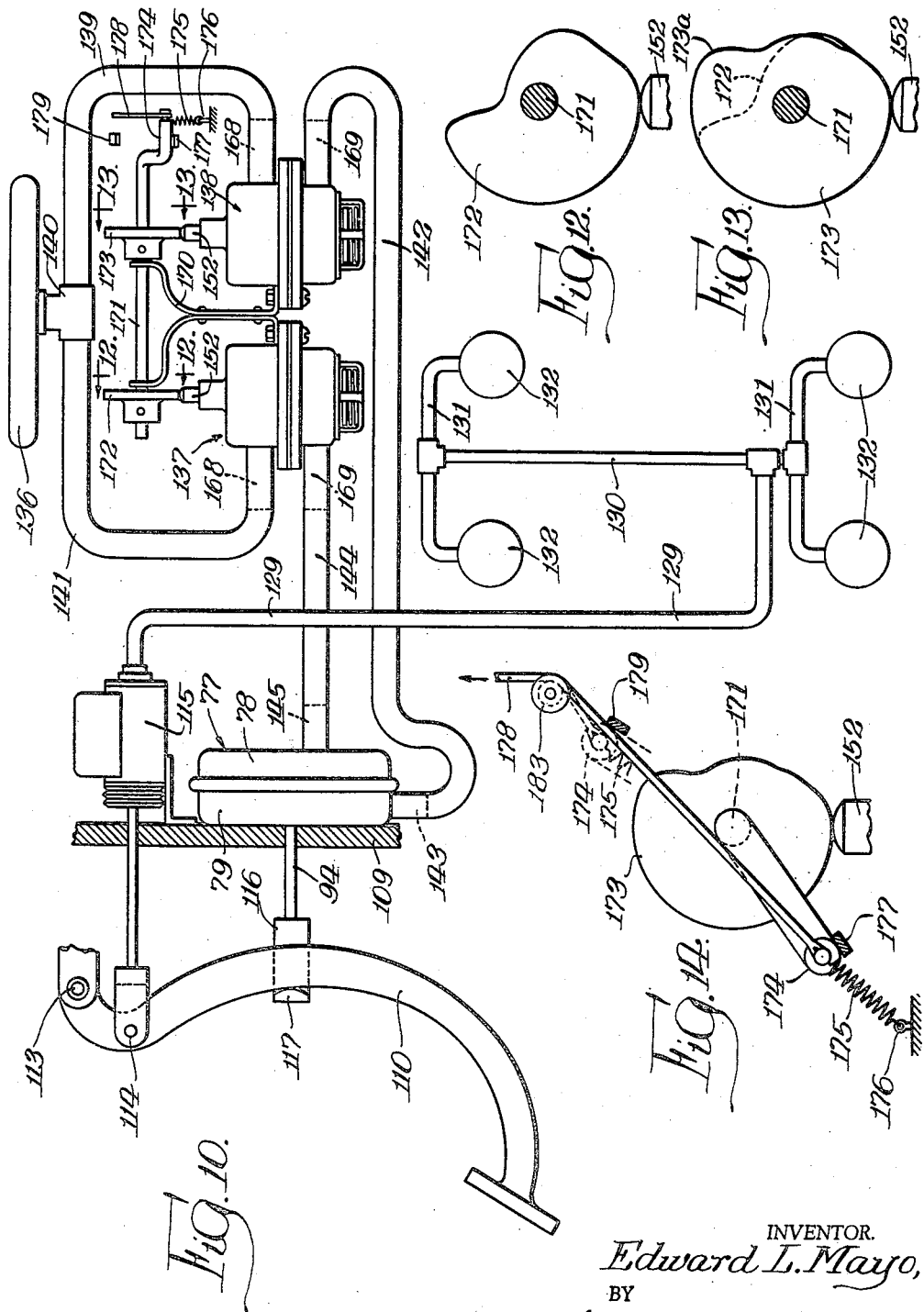

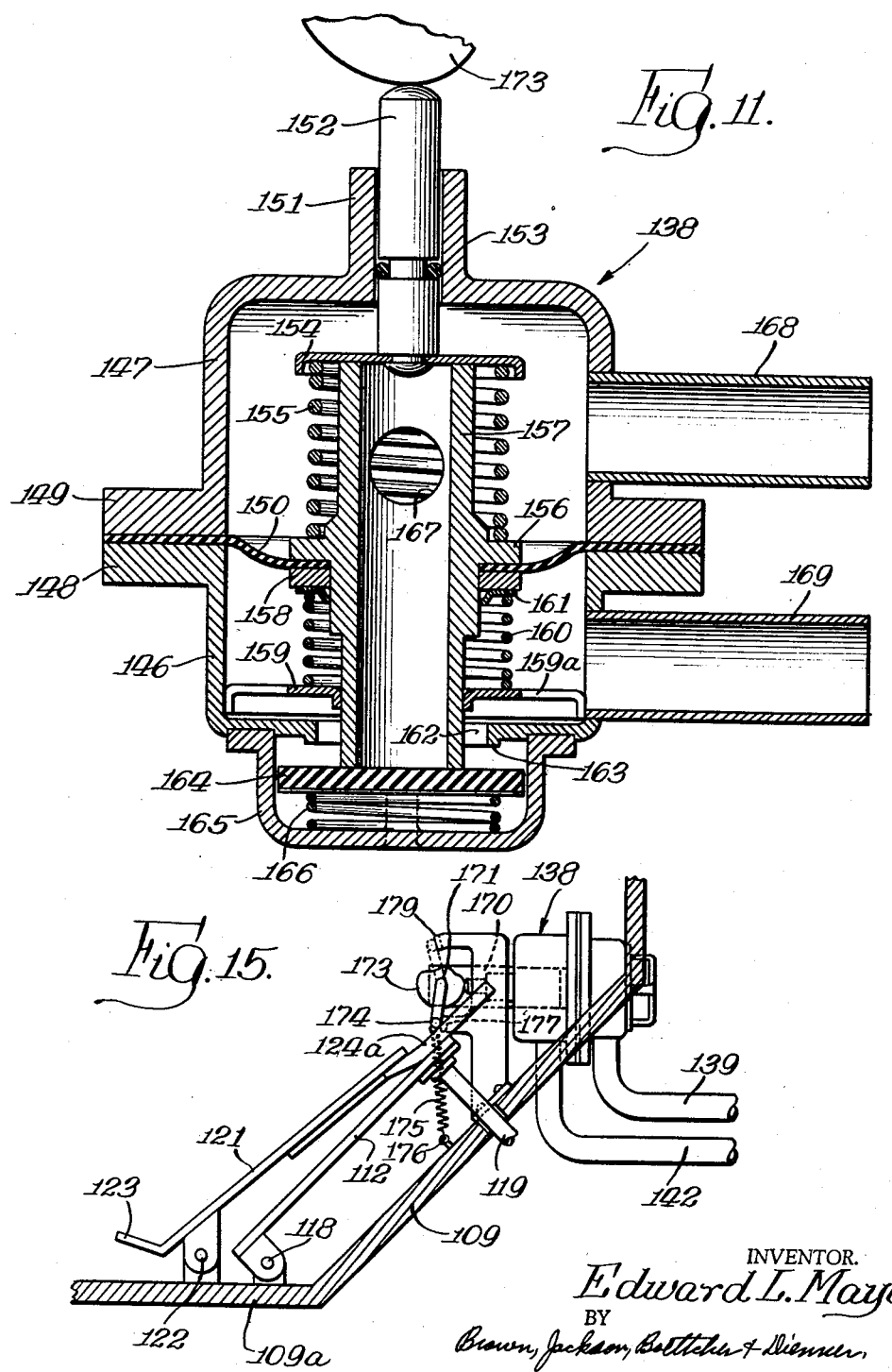

April 5, 1960  E. L. MAYO  2,931,181
POWER BRAKE MEANS FOR AUTOMOBILES
Filed Dec. 3, 1957  6 Sheets-Sheet 6

INVENTOR.
Edward L. Mayo,
BY
Brown, Jackson, Boettcher & Dienner
Atty's.

United States Patent Office 2,931,181
Patented Apr. 5, 1960

2,931,181

POWER BRAKE MEANS FOR AUTOMOBILES

Edward L. Mayo, Cleveland, Ohio, assignor to The Bishop and Babcock Manufacturing Company, Cleveland, Ohio, a corporation of Ohio Application December 3, 1957, Serial No. 700,317

7 Claims. (Cl. 60—60)

This invention relates to braking systems for automotive vehicles, and has to do with brake means particularly suitable for use with passenger automobiles.

Power brakes for passenger automobiles are well known and rather extensively used. They include a booster unit actuated by pressure from a master cylinder for connecting to the engine intake manifold a suction operated diaphragm power motor which operates an auxiliary cylinder from which pressure is transmitted to the wheel brake cylinders. In braking the accelerator pedal normally is released and the full suction of the intake manifold is then available for braking purposes. The braking power then available from the booster is, in general, approximately nine pounds per square inch of area of the diaphragm of the power motor and constitutes the major portion of the braking power, a minor portion of which is provided by foot pressure on the brake pedal transmitted from the master cylinder to the wheel brake cylinders. The available braking power of the booster unit is in excess of that ordinarily required for braking at moderate or low speeds, or when driving in traffic. As a result, the present power brakes referred to are oversensitive and frequently result in abrupt stops due to over braking. That may result in collision with a following automobile, particularly if the latter is not provided with power brakes, and in skidding on wet or slippery surfaces, objectionable for obvious reasons. In an effort to avoid such oversensitivity, lost motion is provided in the braking system to permit an unlimited amount of braking by foot pressure after the booster is actuated, but that has provided to be unsatisfactory due to the difficulty to determine by feel the extent of depression of the brake pedal for booster actuation prior to foot pressure braking, and the oversensitivity in braking referred to still persists. In the known power brakes the booster unit is a major item of expense and contributes materially to the cost of the braking system. Also, in all of such power brakes with which I am familiar braking is accomplished by pressure exerted upon the conventional brake pedal. The driver, in order to apply the brakes, must remove his right foot from the accelerator pedal and place it upon the brake pedal before he can initiate braking by the power brake means, which is objectionable. On the average, an interval of approximately four seconds elapses between the time the driver recognizes the necessity for braking and the time when he exerts effective braking pressure on the brake pedal for a stop. Approximately one-half of that time is required for the driver reflex to transfer his foot from the accelerator pedal to the brake pedal and actuate the brakes. If the automobile is travelling at moderate speed, 40 miles per hour for example, there may not be sufficient time available in which to stop the automobile and a collision, possibly resulting in a serious accident, may occur.

My invention is directed to brake means which avoids the above noted objections to the present power brake systems. To that end I provide brake means which eliminates the presently used booster unit while providing adequate braking pressure which may be supplemented by foot pressure on the brake pedal in case of emergency. In the brake means of my invention braking pressure is exerted upon the brake pedal by a suction operated diaphragm power motor of sufficient power to provide adequate pressure in the wheel brake cylinders directly from the master cylinder. The power motor is connected to a suitable suction source, conveniently the intake manifold of the automobile engine, by means such that the effective braking suction delivered from the manifold to the motor diaphragm may be so controlled as to assure braking power adequate for any braking requirement while avoiding excessive braking power and resultant oversensitiveness and over braking. The connection between the brake pedal and the power motor is such that if desired the brake pedal may be operated independently by foot, for mild braking, or may be pressed by foot in conjunction with the power motor, in case of emergency when it is necessary to make an abrupt or crash stop. Operation of the power brake means may be controlled in any suitable manner, preferably, though not necessarily, either by hand or by the accelerator pedal, thereby avoiding necessity for the driver shifting his foot from the accelerator pedal to the brake pedal and assuring that the brakes may be applied with a minimum of delay. The braking means of my invention includes means whereby smooth braking, particularly in the lower speed ranges, is assured, avoiding abrupt stops such as frequently occur with the present power brakes referred to, which are oversensitive at the lower speeds. Further objects and advantages of my invention will appear from the detail description.

In the drawings:

Figure 1 is a side view of the control valve means of the brake means of my invention;

Figure 2 is a front view of the control valve means of Figure 1;

Figure 3 is a sectional view, on an enlarged scale, taken substantially on line 3—3 of Figure 2, certain parts being shown in elevation and certain other parts being broken away and shown in section.

Figure 4 is a central axial sectional view of the suction operated power motor of the brake means of my invention;

Figure 5 is a plan view of the brake pedal, the steering column, in section, and the accelerator pedal unit and the control valve means, showing the arrangement thereof in the braking means of my invention;

Figure 6 is a sectional view taken substantially on line 6—6 of Figure 5, showing the floor and the fire wall of an automobile in section with the suction operated power motor mounted on the fire wall and connected to the control valve means and to the brake pedal;

Figure 7 is a plan view of a modified form of accelerator pedal unit suitable for use in the brake means of my invention;

Figure 8 is a sectional view taken substantially on line 8—8 of Figure 7;

Figure 9 is a diagrammatic view of the brake means of my invention;

Figure 10 is a diagrammatic view of a modified form of brake means of my invention;

Figure 11 is an axial sectional view, on an enlarged scale, of one of the control valves of the brake means of Figure 10;

Figure 12 is a sectional view, on an enlarged scale, taken substantially on line 12—12 of Figure 10;

Figure 13 is a sectional view, on an enlarged scale, taken substantially on line 13—13 of Figure 10;

Figure 14 is an end view of the cam shaft and associated parts of Figure 10;

Figure 15 is a side view of a modified form of control valve operating means for the brake means of Figure 10, in which the control valves may be operated by an accelerator pedal unit;

Figure 16:
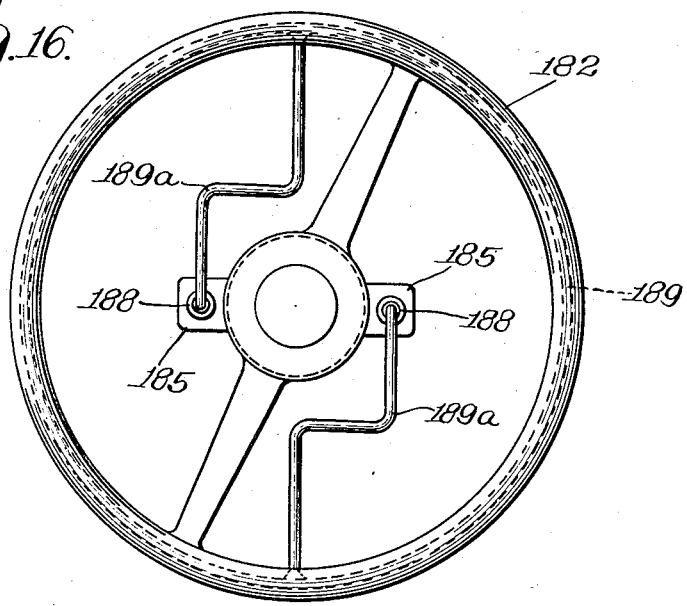
Figure 16 is a top plan view of the steering column and the steering wheel thereon showing the hand operated means on the steering column for operating the control valve means.

The control valve means comprises a mounting plate 10 having openings receiving two cylinders 11 and 12 into the lower ends of which open nipples 13 and 14, respectively. The nipple 13 is connected to a suitable source of suction and the nipple 14 is connected to a pneumatic suction motor, as will be explained more fully later, cylinder 11 being a suction cylinder and cylinder 12 being an air admission cylinder. Cylinder 11 is provided at its upper end with an outer circumferential flange 15 recessed from its upper face for reception of a circumferential bead 16 of an elastic diaphragm 17, formed of rubber or other suitable material. Bead 16 is clamped between the bottom of the recess or channel in flange 15 and an annular clamp plate 18 secured to flange 15, conveniently by bolting, the bolts for securing plate 18 conveniently passing through the mounting plate 10 and serving also to secure it to flange 15.

The diaphragm 17 is provided with a central upwardly extending neck 19 in which is anchored, by a cap nut 20, the upper end of a valve stem 21 slidably mounted through a guide 22 secured in the upper portion of cylinder 11 and provided with a plurality of openings 23. A suction control valve 24 is secured on stem 21 a short distance above the lower end thereof and normally seats upon an annular valve seat member 25 formed of rubber or other suitable elastic material and confined between a lower ring 26 seating upon an interior shoulder 27 of cylinder 11 and an upper ring 28 of angle cross section suitably secured in cylinder 11, conveniently by having a push fit therein. As will be seen from Figure 3, the valve 24 is disposed above nipple 13 and controls communication between the lower portion of cylinder 11 and the upper portion thereof.

A stirrup 30 extends above and bridges neck 19, to which it is anchored by a ring 31 integral with stirrup 30 and fitting about neck 19 at the underface of a circumferential flange 32 at the upper end of neck 19. Stirrup 31 is provided at the center of the bight portion thereof with a downwardly extending rounded boss 33 and receives the forward end portion of the lower arm 34 of a leaf spring 35 of substantially elongated Z-shape. The inner end portion of the upper arm 36 of leaf spring 35 is secured to a yoke 37 pivoted at its inner end, at 38, on a U bracket 39 secured to and extending upward from clamp plate or ring 18. Normally valve 24 is in its closed position shown in Figure 3 with the lower arm 34 of leaf spring 35 spaced a short distance below boss 33, as shown.

The outer portion of arm 34 of leaf spring 35 is reduced in width to pass through the stirrup 30 and upper arm 36 of leaf spring 35 is provided, adjacent its outer end, with an opening which receives the threaded upper portion of a valve stem 41 attached thereto by nut 42 threaded on stem 41 and seating on the upper face of arm 36, there being a washer 43 disposed about stem 41 at the underface of arm 36. A compression spring 44, disposed about valve stem 41, is confined between washer 43 and an air admission valve 45 secured to the lower end of stem 41. Valve 45 cooperates with an annular seat member 46 preferably formed of rubber or other suitable elastic material and confined between a lower ring 47 seating on an interior shoulder 48 of cylinder 12 and an upper ring 49 of angle cross section secured in the upper end of cylinder 12, conveniently by having a push fit therein. The air admission valve 45 is provided with a downwardly extending stud 51 slidable through a guide member 52 secured in cylinder 12, conveniently by having a push fit therein, above nipple 14. The guide member 52 is provided with a plurality of openings 53 and is disposed at about the mid-height of a short tube 54 cross connecting the cylinders 11 and 12 and establishing free communication therebetween above the suction valve 24 and below the air admission valve 45.

A control valve operating lever 57 of approximately Z-shape is pivoted adjacent its rearward end, at 58, in a U bracket 59 secured to the mounting plate 10. The upper arm 60 of lever 57 overlies the leaf spring 35 and associated parts and extends beyond the forward end of mounting plate 10. An eye bolt 64 is secured through arm 60 by means of a nut 65 threaded on its upper end. A tension spring 67 is anchored at its upper end to eye bolt 64 and at its lower end to mounting plate 10. Spring 67 urges lever 60 in counterclockwise direction about its pivot 58 and normally holds it in brake releasing position, with suction valve 24 in closed position and the air admission valve 45 in open position, as shown in Figure 3. A second eye bolt 68 is secured through arm 60 of lever 57 by a nut 69 threaded on its upper end. A tension spring 70 is anchored at its upper end to the eye bolt 69 and at its lower end to the forward end of arm 34 of leaf spring 35. In the normal position of lever 57 tension spring 70 is slack and arm 34 of leaf spring 35 is spaced downward beyond the bight portion of the stirrup 31 providing a lost motion connection between the two. The lower arm 71 of lever 57 is of relatively short length and receives a bolt 72 threaded therethrough and extending downward through an opening 73 in mounting plate 10 of adequate size to accommodate movement of bolt 72 with the lever 57. A nut 74 threaded on bolt 72 between arm 71 and mounting plate 10 provides an adjustable stop in cooperation with plate 10 for limiting clockwise movement of lever 57 about its pivot 58. During the first part of the movement of lever 57 in clockwise direction, which is its brake applying direction, the air admission valve 45 is closed, as indicated in broken lines in Figure 3, and thereafter yoke 37 is swung in clockwise direction by the eye bolt 68 and tension spring 70 until the lower arm 34 of leaf spring 35 contacts boss 33 of stirrup 30, after which, in the continued upward movement of arm 60 of lever 57, the suction valve 24 is moved to open position thus establishing communication between nipples 13 and 14, for a purpose to be explained presently, spring 70 being then under tension.

The control valve means of Figures 1 to 3, inclusive, is used in connection with a suction operated power motor 77 shown more clearly in Figure 4. The motor 77 includes a housing formed in two sections 78 and 79 secured together by a clamp ring 80 engaging over arcuate circumferential flanges 81 and 82 of sections 78 and 79, respectively, the flanges 81 and 82 clamping between them a peripheral bead 83 of circular cross section integral with a diaphragm 84 comprising a rim portion 88 formed of rubber or other suitable material and two discs 85 together providing the head of the diaphragm. The discs 85 are provided with peripheral beads 86 of circular cross section and with offset peripheral portions defining between them a channel in which is clamped a bead 87 extending about the radially inner edge of the rim portion 88 of the diaphragm. A tubular fitting 89 is inserted through end wall 90 of casing section 79 and is provided at its inner end with an outer circumferential flange seating on the inner face of wall 90. Fitting 89 is clamped to wall 90 by a nut 92 threaded thereon, there being a washer 93 interposed between nut 92 and wall 90. A plunger 94 is slidably mounted through fitting 89 and is provided at its inner end with a reduced screw stud 95 upon which is threaded an outer nut 96 clamping the center of the outer disc 85 to plunger 94, and an inner nut 97 clamping the center of the inner disc 85 between the nuts 96 and 97. Wall 90 of section 79 of casing 77 is provided with an opening 98 through which that end of casing 77 has permanent communication with the atmosphere and section 78 of casing 77 has secured therethrough a nipple 100 by means of which the interior of casing 77, between the diaphragm and wall 99, may be connected to a source of suction, as will be explained presently. A spiral compression spring 101 is confined between discs 85 of diaphragm 84 and wall 99 of the motor casing and yieldingly urges the discs 85 and with them the plunger 94 outward of the casing.

The suction operated power motor 77 of Figure 4, which is the operating motor of the braking means of my invention, is mounted adjacent the brake pedal 110 of the automobile on the front of the fire wall 109, through which plunger 94 extends, as shown in Figure 6. The brake pedal 110 is disposed adjacent the steering column 111, at the left thereof and the accelerator pedal 112 is spaced a short distance from the steering column 111 at the right thereof, in accordance with the usual practice. The brake pedal 110 is pivoted at 113, is normally held raised by suitable yielding means (not shown) and has operating connection at 114 to master cylinder 115 of the brake means of my invention, to be considered more fully presently. Plunger 94 is provided at its rearward end with an L shaped head 116 finger 117 of which overlies brake pedal 110 at the rear thereof, when pedal 110 is in its normal position. Accordingly, the brake pedal 110 may be used for braking purposes by foot pressure either independently of motor 77 or in conjunction therewith, as desired or as circumstances may require.

The main or primary accelerator pedal 112 is pivoted at 118 on floor 109a of the automobile (Figures 5 and 6) and is yieldingly held in its normal raised idling position by known means (not shown). An accelerator push rod 119 extends through fire wall 109 and is suitably connected to accelerator pedal 112 adjacent the upper end thereof, at 120, for accelerating the engine when pedal 112 is depressed, in a known manner. A supplementary accelerator pedal 121 is pivoted at 122 on floor 109a in rear of and adjacent pedal 112, and extends an appreciable distance rearward beyond its pivot 122. Supplementary pedal 121 overlies the main or primary pedal 112 and is provided with an angularly disposed rearward extension 123 in the nature of a heel engaging flange. An arm 124 is secured to the forward portion of supplementary pedal 121, preferably at the underface thereof, and projects forwardly therefrom. Arm 124 normally rests upon the forward end of pedal 112 and pedals 112 and 121 together constitute an accelerator pedal unit which may be operated in the usual manner, when supplemental pedal is in its normal position shown, for accelerating and decelerating. The pedal 112 may be of any suitable type and may be connected to the parts operated thereby in any suitable known manner, as will be understood from what has been said. Likewise, the brake pedal 110 may be of any suitable known type mounted in any suitable manner and connected to the master cylinder 115 in any suitable manner.

The control valve means is mounted in a block 125 secured by a strap 126 on the steering column 111 a short distance above the fire wall 109 and preferably is enclosed by block 125 and a housing 127 suitably mounted on the upper face of block 125. Arm 60 of lever 57 projects through the inner end of housing 127 and is bent at its inner portion so as to overlie arm 124 of supplementary accelerator pedal 121. In the normal idling position of the accelerator pedal unit including pedals 112 and 121 arm 60 is disposed in close proximity to arm 124, as shown in Figure 6. Under normal driving conditions not requiring braking, the accelerator pedal unit is depressed to a greater or lesser extent and supplementary pedal 121 is not swung in counterclockwise direction beyond its normal position shown in Figure 6. The control valve means operating lever then remains in its normal position shown in Figures 1 to 3, inclusive, and the suction operated power motor 77 remains ineffective, as will be understood from what has been said.

Referring now to the diagram of Figure 9, master cylinder 115 is connected by conduits 129, 130 and 131, provided with appropriate fittings, to the usual wheel brake cylinders 132 of the automobile. The brake system shown, from master cylinder 115 to the wheel brake cylinders 132 is similar to the known power brake systems previously referred to except that the above mentioned booster unit present in such known systems is omitted.

Referring to Figures 3, 4 and 9, nipple 13 of the suction valve chamber 11 is connected by flexible hose or conduit 135 to a suitable suction source 136, conveniently the automobile engine intake manifold, and nipple 14 of the air inlet valve chamber 12 is connected by a flexible hose or conduit 137 to nipple 100 of the suction operated power motor 77. Normally the suction and air inlet valves 24 and 45, respectively, are in their positions shown in full lines in Figure 3. The power motor 77 is then open to atmosphere and is disabled and rendered ineffective for braking. When it is desired to brake the automobile, the supplementary accelerator pedal 121 is swung upward and rearward beyond its normal idling position thereby moving the control valve means operating lever 57 in braking direction in the upward movement of arm 60 of that lever. During the first part of the upward movement of arm 60 air inlet valve 45 is moved to closed position after which the suction valve 24 is moved to open position, due to the lost motion connection previously referred to. Closing of air inlet valve 45 and opening of suction valve 24 closes motor 77 to atmosphere and opens it to suction thereby enabling motor 77 and rendering it effective for braking. In the continued upward movement of arm 60 suction valve 24 is opened to an increasing extent and compression spring 44 is placed under compression thereby assuring that the air inlet valve 45 remains seated. Opening of the suction valve 24 establishes communication between the source of suction or manifold 136 and the interior of casing 77 of the power motor through the cross connection tube 54, chamber 12, nipple 14 and conduit 137 and nipple 100. That creates a suction or partial vacuum within motor 77 and diaphragm 84 is forced by atmospheric pressure toward wall 99 thereby exerting braking pressure on the brake pedal 110, which pressure is transmitted by the master cylinder 115 to the wheel brake cylinders 132. When the suction in the power motor 77 reaches a value sufficient to overcome the tension of spring 70, suction valve 24 is moved to closed position by atmospheric pressure on the upper face of diaphragm 17 and remains closed so long as the operating lever 57 remains stationary. With the operating lever 57 stationary in braking position and the suction valve 24 closed, the pressure exerted on the brake pedal 110 remains constant and the brakes remain applied under predetermined constant pressure. If arm 60 of lever 57 is raised a further distance the suction valve 24 is again opened and further suction is applied to the power motor 77 with resulting increase in pressure on the brake pedal 110 and corresponding increased braking pressure in the wheel brake cylinders 132. In case of emergency the arm 60 of control lever 57 may be moved quickly upward to its full extent thus rendering available the full power of the system for braking purposes. In extreme cases, the rapid upward movement of arm 60 to its full extent may be augmented by foot pressure exerted upon the brake pedal 110 by the driver's left foot, thus providing braking pressure additional to that of the motor 77 for an abrupt or crash stop of the automobile. Except under unusual conditions the power available from the motor 77 is adequate. Braking is effected by movement of the accelerator pedal unit and there is no necessity for the driver removing his foot from the accelerator pedal. Accordingly the brakes may be applied with a minimum of delay and to any extent desired. It is also desirable when travelling upon icy or slippery surfaces that the engine power remain available for maneuvering out of a skid. The brake pedal 110 is not secured to the power motor 77 and may be used independently thereof, if desired, or in conjunction with the primary motor for applying the maximum possible braking pressure in emergency, as above explained. Normally, when travelling upon slippery surfaces the automobile is driven at moderate or low speed and the brake pedal 110 may then be depressed by the driver's left foot for braking purposes, the pedal pressure then being sufficient. That leaves the accelerator pedal unit free so that engine power is available, if required, in case of a skid.

It will be understood, from what has been said, that the effective braking pressure is determined by the extent of opening of the suction valve 24. If but mild braking is desired that valve is opened to but a slight extent, and if additional braking is required it is obtained by opening valve 24 a bit further. In that manner assurance is had that the full braking power of the motor 77 is not utilized except when needed. Accordingly, the braking power rendered available, in any particular case is only that required by circumstances. I thus provide for adequate braking power as required and avoid oversensitivity and over braking at lower speeds, such as occurs in the present power braking systems previously referred to. The braking means of my invention is highly flexible in respect to braking power rendered available to suit requirements, while effectively guarding against oversensitivity and resultant overbraking at the lower speeds, and renders available the brake pedal for braking by foot pressure at lower speeds and the accelerator pedal for maneuvering in skids.

The suction operated power motor 77 may, within the broader aspects of my invention, be of any suitable type, that shown being preferable in certain respects. As above stated motor 77 preferably is mounted on the front of the fire wall 109 of the automobile. It is comparatively short and can readily be accommodated in the space available at that location. The motor 77 may be of substantial diameter, such as to assure that the braking pressure exerted by motor 77 on the brake pedal 110 will be adequate to effect an abrupt or crash stop in case of emergency. Further, the pressure exerted on the brake pedal 110 by motor 77 may, in extreme cases, be augmented by pressure exerted on pedal 110 by the left foot of the driver while operating the control valve means with his right foot to obtain maximum available pressure from motor 77.

In the modified form of accelerator pedal unit shown in Figures 7 and 8, the accelerator pedal unit 112a is pivoted at 118a and has lost motion connection 120a to rod 119 permitting upward and rearward swinging movement of unit 112a from its normal idling position for braking, unit 112a having downward swinging movement from its idling position for accelerating in the usual manner. Unit 112a is extended a substantial distance rearward beyond its pivot 118a providing a heel receiving portion 112b having an upwardly extending heel flange 112c. The control valve means operating lever arm 60a is extended and overlies the forward upper end portion of accelerator pedal unit 112a in close proximity thereto, when the latter is in its normal idling position. When accelerator pedal unit 112a is swung upward and rearward beyond idling position, arm 60a of the control valve means operating lever is moved upward for braking. The operation is the same as above described and need not be repeated here.

In the modified form of brake system or means shown in Figure 10 I provide two control valves 137 and 138, one of which, valve 138 for example, is shown in section in Figure 11. The control valves 137 and 138 are of the same construction and operation, each comprising a casing formed in two substantially cylindrical sections 146 and 147 having outwardly extending circumferential base flanges 148 and 149, respectively, bolted together and clamping between them the outer marginal portion of a flexible diaphragm 150 of suitable material. Casing section 147 is provided at its upper end with a neck 151 which slidably receives a plunger 152 having a circumferential groove receiving an O sealing ring 153 producing an air tight seal about plunger 152. A cup 154, secured to the inner end of plunger 152, receives the upper end of a compression spring 155 the lower end of which seats on an outer circumferential flange 156 of a tubular vacuum control valve member 157 disposed within spring 155 and also seating at its upper end in cup 154. The inner marginal portion of diaphragm 150 is clamped between flange 156 and a clamp ring 158 disposed at about the midlength of valve member 157 and secured thereto in a suitable manner, as by having a drive fit thereon. The lower portion of valve member 157 is slidable through a guide 159 secured in the lower portion of casing section 146 in a suitable manner, as by having a drive fit therein. A compression spring 160, considerably lighter than spring 155, is disposed about valve member 157 and confined between guide 159 and a seat member 161 seating on ring 158. Casing section 146 is provided at its lower end with an air inlet port 162 concentric with, and of materially greater diameter than, valve member 157, and a valve seat element 163. The lower end of valve member 157 is accurately formed to provide a seat for an air intake disc valve member 164, formed of rubber or any suitable material, operable in an open valve cage 165 suitably secured, conveniently by welding, to the bottom of casing section 146. A compression spring 166, confined between the bottom of valve cage 165 and disc valve member 164, yieldingly urges the latter toward valve member 157 normally holding it seated thereon. When the vacuum control valve member 157 is in its normal brake releasing position, shown in full lines in Figure 11, disc valve member 164 is spaced from its seat element 163 admitting air, through port 162 and openings 159a in guide 159, to the casing section 146.

The vacuum control valve member 157 is provided with an opening 167 to the interior of casing section 147, which has a nipple 168 opening thereinto, and casing section 146 has a nipple 169 opening into it. As above noted the control valves 137 and 138 are of the same construction and operation and a detailed description of one thereof will suffice, and the same reference numbers are applied to the corresponding parts of the respective valves.

Referring to Figure 10, the upper nipple 168 of valve 138 is connected by conduit 139 and T fitting 140 to the source of suction or intake manifold 136 and the upper nipple 168 of valve 137 is also connected by conduit 141 and T fitting 140 to the intake manifold 136. The lower nipple 169 of valve 138 is connected by conduit 142 to a nipple 143 secured to and opening into section 79 of the housing of motor 77. The lower nipple 169 of valve 137 is connected by conduit 144 to a nipple 145 secured to and opening into section 78 of the housing of motor 77. The plunger of motor 77 and the master cylinder 115 are connected to the brake pedal 110 in the same manner as in Figure 9. As will be understood, an O ring or other suitable air tight sealing means is provided about plunger 94.

The two valves 137 and 138 are juxtaposed and are secured together by a Y bracket 170 disposed therebetween and bolted thereto and extending upward thereabove. A cam shaft 171 is rockably mounted in bracket 170 and has secured thereon two cams 172 and 173 disposed to contact the upper ends of the plungers 152 of valves 137 and 138, respectively. The cam shaft 171 is provided at one end thereof with a crank arm 174 to which is anchored one end of a tension spring 175 anchored at its other end to a fixed point 176. Tension spring 175 normally holds crank arm 174 in contact with a stop 177 thereby holding the cam shaft 171 in such angular position that the high points of the cams 172 and 173 bear upon the upper ends of the plungers 152 of the valves 137 and 138, respectively. The tubular valve member 157 of each of the valves is then held in its fully lowered or depressed position shown in Figure 11, with its lower end seating on and closed by the disc valve member 164 and the latter spaced a material distance below its associated seat element 163. Both of the valves 137 and 138 are then opened to atmosphere and closed to the source of suction or intake manifold 136, both sections of the housing of motor 77 being then open to atmosphere and closed to suction thereby rendering the motor 77 ineffective. Crank arm 174 of cam shaft 177 is connected by a cable 178 to a hand control operating member for turning cam shaft 171 in opposition to the tension spring 175, as will be explained more fully later.

The cams 172 and 173 are so formed and disposed that in the normal position of cam shaft 171, shown in Figures 12 to 14, inclusive, both valves 137 and 138 are open to atmosphere and closed to suction. Cam shaft 171 is turned clockwise for braking. At the start of the braking operation the valve member 157 of valve 138 is moved upwardly by springs 160 and 166, as permitted by cam 173, until the disc valve member 164 is seated, closing the air inlet port 162. Valve member 157 of valve 138 then moves upward a short distance away from the disc valve member 164 so as to be cracked open, thus establishing limited or restricted communication between section 79 of the housing of motor 77 and the intake manifold 136, by way of T fitting 140, conduit 139, nipple 168, opening 167 in valve member 157, valve member 157, nipple 169 and conduit 142 and nipple 143. While valve 138 is being closed to atmosphere and opened to suction under control of cam 173, valve 137 is also being closed to atmosphere under control of the cam 172. Immediately after valve 138 has been cracked open to suction, as above described, valve 137, now closed to atmosphere, is also opened to suction to a greater extent than valve 138, cam 172 being appropriately formed to that end. The suction in section 79 of the housing of motor 77 then acts as a drag in opposition to the suction in section 78 of the housing of motor 77, the suction in section 78 being somewhat greater than that in section 79 and effective for moving the diaphragm of motor 77 in brake applying direction thereby applying the brakes in the same manner as in the system or brake means of Figure 9. In the continued turning of cam shaft 171 in braking direction, the valves 137 and 138 are opened to increasing extent, the rate of opening of valve 137 being greater than that of valve 138, the cams 172 and 173 being appropriately formed to accomplish that result, so that a continued and increasing braking effect is obtained accompanied by the drag imposed by the suction or partial vacuum of increasing value in section 79 of the housing of motor 77 so that the braking is smooth and risk of abrupt stops is obviated. When the automobile is travelling at moderate speeds the valves 137 and 138 are not fully opened to suction and the full braking power is not available, through the braking power then available is adequate for stopping at such moderate speeds, and abrupt stops due to overbraking are avoided. When travelling at higher speeds, in excess of from 30 to 40 miles per hour, for example, the cam shaft 171 is turned in braking direction to such extent that plunger 152 of valve 138 is depressed to its lowermost position by lobe 173a of cam 173, cam 172 being then in such position as to clear the plunger 152 of valve 137. The valve 138 is then open to atmosphere and closed to suction, as shown in Figure 11, and the valve 137 is closed to atmosphere and opened to its fullest extent to suction. That renders available for braking the full power of the motor 77 adequate for quick or crash stops at the higher speeds, in case of emergency.

As will be understood from the above, in the braking system of Figure 10 the motor 77 is the same as that shown in Figure 4 except that the opening 98 is omitted, and the suction from intake manifold 136 is admitted to the suction spaces or chambers of the motor 77 at opposite sides of the diaphragm 84. The effective braking suction delivered from the intake manifold 136 to motor 77 is controlled by the valve means in such manner that the available braking power is not objectionably in excess of that required under given conditions, and the full suction effect of the intake manifold 136 with resultant maximum braking power may be rendered available in emergency for a crash stop. In that manner, the effective suction of the intake manifold 136 is diluted as desired, to suit conditions, smooth braking with adequate power is assured, and over sensitiveness and over braking are avoided.

When cam shaft 171 is in its normal position, braking at low speeds may be effected by foot pressure on the brake pedal 110 which, when depressed, transmits braking pressure from the master cylinder 115 to the wheel brake cylinders 132. As will be clear from what has been said, the brake pedal 110 is at all times available for braking purposes in the event of failure of the control valves or of motor 77 and, if desired, may be used to augment by foot pressure the braking pressure exerted by motor 77, through that may seldom be required.

In the modification shown in Figure 15 arm 124a of the supplementary accelerator pedal 121 underlies crank arm 174 of cam shaft 171 effective for turning the latter in braking direction when pedal 121 is swung upward and rearward from its normal position shown. The operation of the braking system or means is the same as that of Figure 10 and need not be repeated here.

Figure 17:
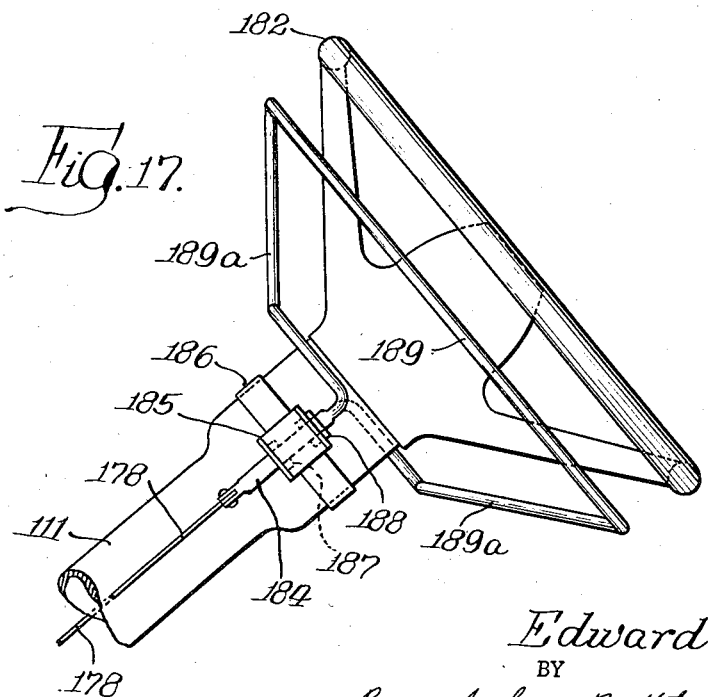
Figure 17 is a side view of the upper portion of the steering column and the steering wheel and associated parts.

Referring further to the hand control operating means and to Figures 16 and 17, a steering wheel 182 is rotatably mounted at the top of column 111, as usual. Cable 178 is led upward from crank arm 174 of cam shaft 171 about suitably disposed guide means, such as a grooved sheave 183, and is secured at its upper end to a plunger 184 slidably mounted in a guide frame 185 disposed at one side of the steering column 111 and mounted thereon by means of a strap 186 secured about column 111. The guide frame 185 preferably is provided with antifriction means 187 to facilitate movement of plunger 184 lengthwise of column 111, downward movement of the plunger being limited by a collar 188 secured thereon above guide frame 185. The plunger 184 is connected by a substantially Z-shaped arm 189a to an operating member 189 underlying the rim of steering wheel 182 in proximity thereto and substantially concentric therewith. The operating member 189 is so disposed relative to steering wheel 182 that it may readily be grasped by the fingers while also grasping the steering wheel, so as to be moved upward for turning cam shaft 171 in braking direction. But little effort is required for that purpose. Tension spring 175 presents increasing resistance to upward movement of operating member 189, thus guarding against too rapid application of braking power under normal driving conditions. Preferably, though not necessarily, I provide two plungers 184, disposed at opposite sides of the steering column 111 with a cable 178 attached to each, the cables 178 being secured together above the guide member 183 or, if desired, being both led about guide sheave 183 and attached to crank arm 174 of cam shaft 171. The operating member 189 preferably is in the form of an annulus, though it may be otherwise suitably formed. If desired, the control valve means of Figures 1 to 3, inclusive, may be operated by the hand control means of Figures 16 and 17 by attaching the cable 178 to the outer end of lever 60 of the latter means, as will be understood from the above. The tension spring 67 then presents increasing resistance to upward movement of lever 60, assuring smooth braking, as it does also when lever 60 is moved upward by the accelerator pedal unit for braking as previously described.

As will be understood from what has been said, in the several forms of my invention shown herein the components of the braking means may be disposed and mounted in any suitable manner as desired or as circumstances may require. In all forms shown the brake pedal and the master cylinder are at all times available for braking purposes if desired or in the event of failure of the power motor or of the control means therefor. Also, in the several forms shown, the control valve means may be operated in any suitable manner, within the broader concept of my invention.

It will be understood that changes in detail may be resorted to without departing from the field and scope of my invention, and I intend to include all such variations, as fall within the scope of the appended claims, in this application in which the preferred forms only of my invention have been disclosed.

I claim:

1. In servo-motor means, a suction source, a suction operated motor comprising a housing and a wall therein movable toward and away from the ends of said housing, a power transmitting member secured to said wall for movement therewith and extending through one end of said housing for connection to a part to be power operated by said member in the movement thereof by said wall in one direction, and means for optionally and simultaneously connecting both sides of said wall to atmosphere or to said suction source to a variable extent and at different rates effective for moving said wall in said one direction under variable degrees of effective suction from said suction source.

2. In servo-motor means, a suction source, a suction operated motor comprising a housing and a movable wall therein providing suction chambers at opposite sides of said wall, the latter being movable toward and away from the ends of said housing, a power transmitting member secured to said wall for movement therewith and extending through one end of said housing for connection to a part to be power operated by said member in the movement thereof by said wall in one direction, and means for optionally and simultaneously connecting both of said chambers to atmosphere or to suction to variable extent and at different rates effective for moving said wall in said one direction under variable degrees of effective suction from said suction source, said last mentioned means being operable for fully opening one of said chambers to atmosphere and fully opening the other of said chambers to said suction source effective for moving said wall in said one direction by the full suction of said suction source.

3. In servo-motor means, a suction source, a suction operated motor comprising a housing and a diaphragm therein providing a first suction chamber and a second suction chamber at opposite sides of said diaphragm, a power transmitting member secured to said diaphragm for movement therewith and extending therefrom through said second chamber and the corresponding end of said housing for connection to a part to be power operated by said member in the movement thereof by said diaphragm in one direction by suction in said first chamber, and control valve means for optionally and simultaneously connecting both of said chambers to atmosphere or to said suction source to variable extent and at different rates effective for moving said diaphragm in said one direction under variable degrees of effective suction from said suction source, said control valve means including means for connecting said second chamber to suction source in advance of said first chamber and thereby opposing movement of said diaphragm in said one direction when said first chamber is initially connected to said suction source.

4. In servo-motor means, a suction source, a suction operated motor comprising a housing and a diaphragm therein providing a first suction chamber and a second suction chamber at opposite sides of said diaphragm, a power transmitting member secured to said diaphragm for movement therewith and extending therefrom through said second chamber and the corresponding end of said housing for connection to a part to be power operated by said member in the movement thereof by said diaphragm in one direction by suction in said first chamber, control valve means for optionally and simultaneously connecting both of said chambers to atmosphere or to said suction source, and control valve operating means effective for connecting both of said chambers to atmosphere and to said suction source to variable extent and at different rates effective for moving said diaphragm in said one direction under control of suction resisting such movement.

5. In servo-motor means, a suction source, a suction operated motor comprising a housing and a diaphragm therein providing a first suction chamber and a second suction chamber at opposite sides of said diaphragm, a power transmitting member secured to said diaphragm for movement therewith and extending therefrom through said second chamber and the corresponding end of said housing for connection to a part to be power operated by said member in the movement thereof by said diaphragm in one direction by suction in said first chamber, control valve means for optionally and simultaneously connecting both of said chambers to atmosphere or to said suction source, and control valve operating means effective for connecting both of said chambers to atmosphere and progressively connecting both of said chambers to said suction source with the rate of connection of said first chamber to said suction source increasing relative to the rate of connection of said second chamber to said suction source effective for moving said diaphragm in said one direction under control of suction in said second chamber resisting such movement.

6. In servo-motor means, a suction source, a suction operated motor comprising a housing and a diaphragm therein providing a first suction chamber and a second suction chamber at opposite sides of said diaphragm, a power transmitting member secured to said diaphragm for movement therewith and extending therefrom through said second chamber and the corresponding end of said housing for connection to a part to be power operated by said member in the movement thereof by said diaphragm in one direction by suction in said first chamber, control valve means for optionally and simultaneously connecting both of said chambers to atmosphere or to said suction source, and control valve operating means effective for connecting both of said chambers to atmosphere and progressively connecting both of said chambers to said suction source with the rate of connection of said first chamber to said suction source increasing relative to the rate of connection of said second chamber to said suction source effective for moving said diaphragm in said one direction under control of suction in said second chamber resisting such movement, said operating means including means for closing said second chamber to said suction source and opening it to atmosphere while said first chamber remains open to said suction source and then opening said first chamber to said suction source to maximum extent thereby rendering available the full power of said motor for moving said diaphragm in said one direction.

7. In servo-motor means, a suction source, a suction operated motor comprising a housing and a diaphragm therein providing a first suction chamber and a second suction chamber at opposite sides of said diaphragm, a power transmitting member secured to said diaphragm for movement therewith and extending therefrom through said second chamber and the corresponding end of said housing for connection to a part to be power operated by said member in the movement thereof by said diaphragm in one direction by suction in said first chamber, control valve means for optionally and simultaneously connecting both of said chambers to atmosphere or to said suction source, an operating member, and operating connections between said operating member and said control valve means effective for connecting said chambers to atmosphere and to said suction source to variable extent and at different rates effective for moving said diaphragm in said one direction under control of suction resisting such movement.

References Cited in the file of this patent

UNITED STATES PATENTS

| | | |
|---|---|---|
| 1,653,985 | Campbell | Dec. 27, 1927 |
| 1,809,014 | Bragg et al. | June 9, 1931 |
| 2,073,163 | Martin | Mar. 9, 1937 |
| 2,094,135 | Porter | Sept. 28, 1937 |
| 2,142,631 | Coyle | Jan. 3, 1939 |
| 2,177,471 | Baade | Oct. 24, 1939 |
| 2,181,757 | Fitzgerald | Nov. 28, 1939 |
| 2,215,602 | Baade | Sept. 24, 1940 |
| 2,265,546 | Price | Dec. 9, 1941 |
| 2,323,406 | Milhaupt | July 6, 1943 |
| 2,457,721 | Price | Dec. 28, 1948 |
| 2,464,327 | Mack | Mar. 15, 1949 |
| 2,603,066 | Rockwell | July 15, 1952 |
| 2,643,518 | Righter | June 30, 1953 |
| 2,643,746 | Righter | June 30, 1953 |
| 2,657,777 | Smith | Nov. 3, 1953 |
| 2,669,329 | Price | Feb. 16, 1954 |
| 2,767,548 | Ayers | Oct. 23, 1956 |
| 2,824,462 | Nelles | Feb. 25, 1958 |
| 2,829,625 | Hupp et al. | Apr. 8, 1958 |

FOREIGN PATENTS

| | | |
|---|---|---|
| 854,755 | Germany | Nov. 6, 1952 |